Dec. 2, 1947.                 C. L. KNAAK                  2,431,810
                     NEEDLE ROLLER BEARING SPACER
                        Filed Feb. 3, 1944
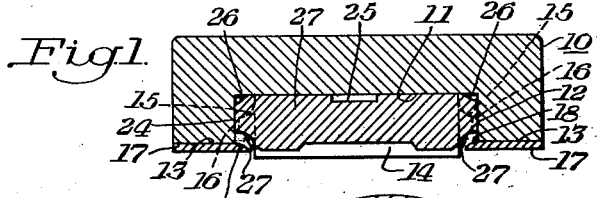
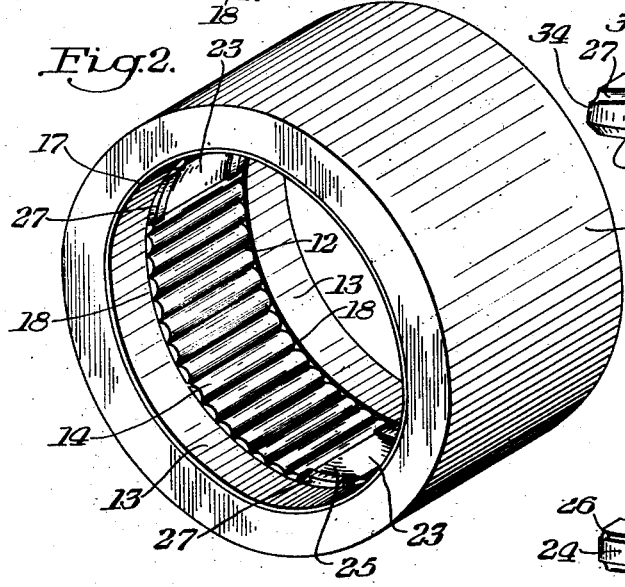
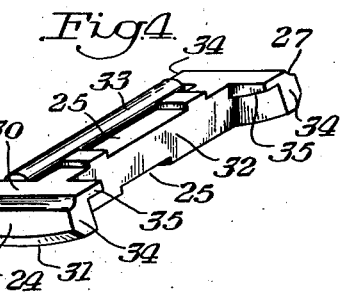
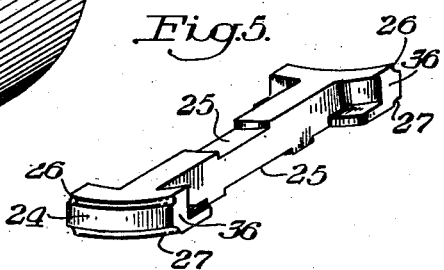
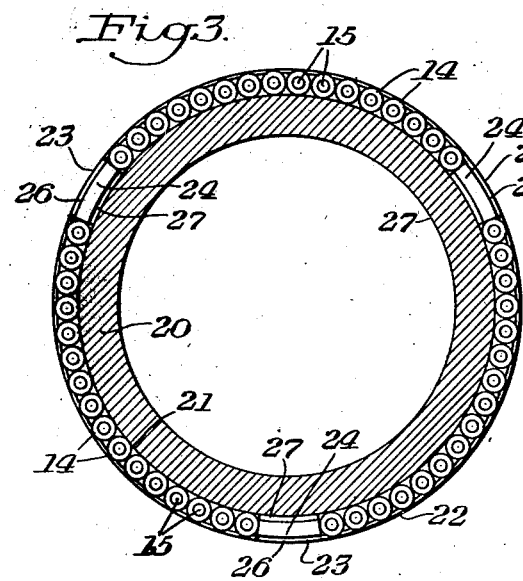
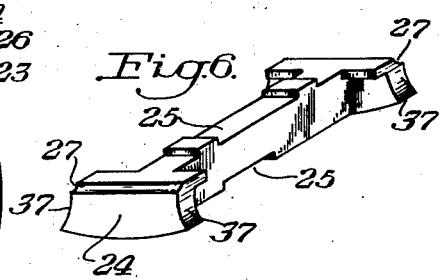
INVENTOR.
Carl L. Knaak,
BY Edward A. Lawrence
   his attorney.

Patented Dec. 2, 1947

2,431,810

UNITED STATES PATENT OFFICE 2,431,810

NEEDLE ROLLER BEARING SPACER

Carl L. Knaak, Crafton, Pa., assignor of one-half to himself and one-half to Clarence F. Succop, Pittsburgh, Pa., jointly Application February 3, 1944, Serial No. 520,855

14 Claims. (Cl. 308—209)

1

This invention relates generally to needle roller bearings and more particularly to spacers which complete the complement of the needle bearings and prevent them from skewing.

The needle rollers of an anti-frictional bearing are materially longer than their diameter which is relatively small in comparison with the diameter of the full bearing complement. Owing to this relative difference in diameter, the rollers tend to skew as the bearing load shifts in a full revolution bearing. The skewing action produces a longitudinal thrust on the needle roller, forcing it against the side wall of the groove in the race, causing destruction. The ends of a needle roller which assume a skewed position work up the cylindrical surface of the race in opposite directions and thus take up the running clearance of the needle rollers. When the bearing load is applied to a needle roller in this position it may be crushed or chipped, thereby destroying the bearing.

The principal object of this invention is the provision of a spacer which takes the place of one or more needle rollers and completes the complement of the bearing and has running engagement with both sides of the grooved race.

In a true running needle bearing the rollers should not exert a material force against the sides of the grooved race.

The needle rollers are either neck-shaped or conical at their ends which character of surface would offer no support against the sides of the grooved race to maintain the axes of the needle rollers parallel to the axis of the bearing even if they were large in diameter. On the other hand the end surfaces of a spacer which is wider than the needle bearing and is arranged to have running engagement with both side walls of a grooved race cannot assume a skewed position. Since the spacer is sufficiently wide to complete the needle roller complement it prevents the needles from assuming a skewed position even though they may be subjected to a longitudinal thrust. This is an important object of this invention.

Another object is the provision of a needle roller bearing spacer the width of which is at least greater than the diameter of a needle roller.

Another object is the provision of a plurality of needle roller bearing spacers having running engagement with both sides of the grooved race and which are geometrically positioned about the bearing complement.

Another object is the provision of a needle roller bearing spacer the side surfaces of which are

2 disposed in planes radial to the axis of the bearing.

Another object is the provision of a needle roller bearing spacer the side surfaces of which are disposed in parallel planes.

Another object is the provision of a needle roller bearing spacer the side surfaces of which are concave to mate with the adjacent rollers but have a surface of curvature greater than that of the rollers.

Another object is the provision of a needle roller bearing spacer the bottom surface of which is cylindrical and mates with the cylindrical surface of the bottom of the grooved race.

Other objects and advantages appear in the following description:

Practical embodiments are shown on the drawing to illustrate the principles of this invention wherein:

Fig. 1 is a sectional view of a needle roller bearing spacer mounted in an internal race.

Fig. 2 is an isometric view of an outer race full complement needle roller bearing having spacers mounted therein.

Fig. 3 is a sectional view of an inner race full complement needle roller bearing having spacers mounted therein.

Fig. 4 is an enlarged view of a spacer for an internal race bearing, the sides of the spacer lying in planes normal to the axis of the bearing.

Fig. 5 is an enlarged view of a spacer for an external race bearing, the sides of the spacer lying in parallel planes.

Fig. 6 is an enlarged view of a spacer for an internal race bearing, the sides of the spacer being concave and having a greater curvature than the cylindrical surface of the rollers.

Referring to Figs. 1 and 2 of the drawing, 10 represents one race of a bearing which is provided with an internal groove 11 defined by the sides 12 and the land sections 13. The needle rollers 14 which operate in the groove 11 have necks 15 at the ends thereof. These needle rollers are not as long as the distance between sides of the grooves 11 as indicated by the space 16 between the ends of the rollers and the side walls 12. An annular retainer ring 17 is mounted on each land section 13 and is provided with an overhanging lip 18 that extends over the side 12 of the groove 11 and overlies but is out of engagement with the neck ends 15 of the rollers to retain them in place when the complementary race is not in assembled position as shown in Figs. 1 and 2. These retainer rings 17 may be secured to the land sections 13 in any desired manner such as by spot welding. The retainer rings are thin and the depth of the groove 11 does not permit these rings to extend above the surface of the needle rollers. Thus the only engaging surfaces between the complementary races are the cylindrical surfaces of the needle rollers.

The bearing race 20 shown in Fig. 3 is externally grooved as indicated at 21 and the rollers 14 are positioned in the same manner as the previously described with reference to Figs. 1 and 2. The necks 15 of the rollers 14 ride under the external retaining ring 22 and are thus held in place in the groove 21 when the outer race, which is not shown, is not in position.

In view of the fact that the diameter of the needle bearing 14 is materially smaller than the diameter of the groove in the race in which the former travels, the radius of curvature of the groove permits the very small diameter needle to assume a skewed position within the ordinary radial and circumferential clearances allowed in such bearings. This difficulty is not experienced with larger diameter rollers as these clearances are substantially the same. In this respect a needle bearing will produce disadvantages not encountered in standard roller bearings.

The spacer block 23 has squared ends 24 and is sufficiently long to permit these ends to have sliding engagement with the sides 12 of the groove 11. These spacers are not as thick as the diameter of the needle rollers 14 and are therefore incapable of assuming any bearing load. The upper and lower surfaces of the spacer blocks may be slotted as indicated at 25 to permit free circulation of the lubricant applied to the bearing.

The bottom edge of the squared ends 24 of the spacers are beveled as shown at 26 in Fig. 1 to prevent dirt or foreign matter from jamming and freezing the spacer and preventing the needle rollers from moving it around the race.

The top edge of the squared ends 24 of the spacers are undercut as shown at 27 to prevent them from engaging the lip 18 of the retainer ring 17 even though they are at the top of the bearing and do not have enough inertia to keep them at the bottom of the internal groove. Thus the spacer will engage either race but will not engage the retainer ring 17.

The spacers should be as wide as the diameter of the needle roller with which they operate but in most bearings it is preferable that they are at least as wide as twice the diameter of the needle rollers. The wider they are the more easily they can be moved around the groove of the race with their squared ends in sliding engagement with the sides of the groove. However the important function of the needle bearing will be defeated if the spacers are made too wide or there are too many of them placed in the bearing. Thus the overall diameter of the bearing together with the size of the needle rollers are determining factors in choosing the size and the number of spacers.

The spacers may be widened if provision is made to include shorter needle rollers within the overall dimension of the spacer, as illustrated in Figs. 4, 5 and 6. The spacer 30 in Fig. 4 is for use in an internally grooved race as the under surface or bottom 31 is arcuate, being provided with the same radius of curvature as the grooved race it fits into. The squared ends 24 are materially wider than the narrow intermediate neck portion 32 which provides a good bearing against the sides of the grooved race.

Both sides of the narrow intermediate portion provide lineal bearing engagement for the short rollers 33. The next adjacent needle roller 14 engages the sides 34 of the end portions and is thus held in alignment which prevents skewing. In this manner the effective width of the spacer is such that it may ride with little friction around the grooved race yet the narrow intermediate portion 32 utilizes the space of only one needle roller. The necked ends of the short needle rollers 33 are retained by the overhanging flanges 35. These short rollers are substantially the same length as the long needle rollers 14 and provide bearing engagement. Thus the advantages of a wide spacer are obtained without impairing the bearing support in its vicinity which permits the use of a greater number of spacers in a single race.

The sides 34 of the spacer shown in Fig. 4 lie in planes radial to the axis of the complete bearing, whereas the sides 36 of the spacer shown in Fig. 5 lie in parallel planes and the sides 37 of the spacer shown in Fig. 6 are arcuate with a radius of curvature less than that of the needle rollers. The arcuate side surfaces 37 provide the greatest width of the squared end surfaces 24 as the tips of these arcuate surfaces extend beyond the normal and radial plane passing through the lineal contacting portion of the adjacent needle rollers 14. The tips are thus effective within the radius of the adjacent needle rollers. This is also true to a limited degree of the lower corners of the squared ends 24 in the spacer shown in Fig. 4. The opposite corners of the spacer with the parallel sides 36 shown in Fig. 5 extend beyond the plane of lineal engagement to a smaller degree depending upon the diameter of the full bearing.

Even though the shape of the sides of the spacers result in slightly extending the dimension of the squared ends 24 of the spacers the effect of producing a narrow spacer that slides easily in the grooved race is greatly magnified.

To obtain the effect of a wide spacer it necessarily follows that one or more short needle rollers must be included within the overall width. Regardless of how the small rollers are included within the overall dimension it is of less importance than the fact that these short needle rollers provide a bearing support and the effective width of the spacer is thus reduced.

I claim:

1. A roller bearing consisting of a cylindrical race, spaced parallel lands the sides of which define an annular bearing groove on the race, a series of uniformly selected cylindrical needle rollers disposed transversely within the groove, the length of the rollers being several times their diameter, conically shaped necks on the ends of each of said rollers, a metal spacer with ends having a width at least greater than the diameter of one roller and inserted in operative engagement between two rollers to complete the annular roller complement, side surfaces on said spacer having lineal engagement with the adjacent rollers, said spacer having substantially the same length as the width of the groove to engage the sides of the groove to permit the ends of the spacer and prevent the rollers from skewing the top edge of the ends of the spacers being undercut, and means on each land section to overhang the necks of the rollers and the undercut ends of the spacer to retain the full bearing complement in the groove.

2. The structure of claim 1 characterized in that a plurality of spacers are geometrically positioned about the bearing complement.

3. The structure of claim 1 characterized in that three of said spacers are equally positioned about the bearing complement.

4. The structure of claim 1 characterized in that there are three spacers each of a width at least substantially equal to twice the diameter of a roller and disposed in spaced relation about the bearing complement.

5. A metallic spacer to complete the complement of a selected series of needle roller bearings in operative relation in a cylindrically grooved race consisting of a member having side surfaces arranged to have lineal engagement with the adjacent rollers, said side surfaces being spaced apart at more than the diameter of one of the rollers, parallel end surfaces on the member arranged to move in substantial engagement with the sides of the groove to prevent the rollers from skewing, the side surfaces being disposed in planes normal to the end surfaces, and the top edges of the end surfaces being undercut to provide a shoulder to permit the spacer to be retained in the bearing complement.

6. The structure of claim 5 characterized in that the side surfaces of the spacer which have lineal engagement with adjacent needle rollers are disposed in planes radial to the axis of the bearing.

7. The structure of claim 5 characterized in that the side surfaces of the spacer which have lineal engagement with adjacent needle rollers are concave having a surface of curvature greater than the surface of curvature of the roller.

8. The structure of claim 5 characterized in that the side surfaces of the spacer which have lineal engagement with adjacent needle rollers are disposed in planes radial to the axis of the bearing and the bottom surface of the member is cylindrical and mates with the cylindrical surface of the groove.

9. The structure of claim 5 characterized in that the side surfaces of the spacer which have lineal engagement with adjacent needle rollers are disposed in planes parallel to one another and the bottom surface of the member is cylindrical and mates with the cylindrical surface of the groove.

10. The structure of claim 5 characterized in that the side surfaces of the spacer which have lineal engagement with adjacent needle rollers are concave having a surface of curvature greater than the surface of curvature of the rollers and the bottom surface of the member is cylindrical and mates with the cylindrical surface of the groove.

11. A roller bearing consisting of a race, spaced cylindrical lands the adjacent sides of which define an annular bearing groove on the race, a series of needle rollers disposed transversely within the groove, a spacer member inserted between two needle rollers in the groove to complete the bearing complement, the spacer member being less in thickness than the diameter of a needle roller, coextensive end portions on the spacer member having parallel surfaces arranged to move in substantial engagement with the sides of the bearing groove, means defining an open space within the dimensions of the coextensive end portions, at least one needle bearing of less length but of the same diameter as the other needle bearings in said open space to provide a bearing support within the spacer member, and means carried by the spacer member to retain the shorter needle rollers in the bearing groove.

12. A roller bearing consisting of a race, spaced cylindrical lands the adjacent sides of which define an annular bearing groove on the race, a series of needle rollers with necked ends disposed transversely within the groove, a spacer member inserted between two needle rollers in the groove to complete the bearing complement, the spacer member being less in thickness than the diameter of a needle roller and having reduced ends, coextensive end portions on the spacer member having parallel surfaces arranged to move in substantial engagement with the sides of the bearing groove, means defining an open space within the dimensions of the coextensive end portions, at least one needle bearing of less length but of the same diameter as the other needle bearings in said open space to provide a bearing support, means carried by the spacer member to retain the shorter needle rollers in the bearing groove, and means on the lands to overlie the ends of the long needle bearings and the spacer to retain the full complement within the bearing groove without the complementary race.

13. A roller bearing consisting of a race, spaced cylindrical lands the adjacent sides of which define an annular bearing groove on the race, a series of needle rollers disposed transversely within the groove, a spacer member inserted between two needle rollers in the groove to complete the bearing complement, the spacer member being less in thickness than the diameter of a needle roller, coextensive end portions on the spacer member having parallel surfaces arranged to move in substantial engagement with the sides of the bearing groove, a transverse portion rigidly connecting the end portions of the spacer member and providing an open space within the latter, at least one needle bearing of less length but of the same diameter as the other needle bearings in said open space to provide bearing support within the dimension of the spacer member, and means on the spacer member bounding the open space to retain the short needle rollers therein.

14. A spacer to complete the complement and maintain alignment of a selected series of needle roller bearings in operative relation in a cylindrically grooved race consisting of a member having coextensive end portions rigidly connected with each other and each provided with exterior parallel surfaces arranged to move in substantial engagement with the sides of the grooved race, means defining an open space within the dimensions of the coextensive end portions to receive needle roller bearings of the same diameter but of shorter length, and means carried by the member to retain the needle rollers within said space.

CARL L. KNAAK.

REFERENCES CITED

The following references are of record in the file of this patent:

UNITED STATES PATENTS

| Number | Name | Date |
| --- | --- | --- |
| 2,008,378 | Witte | July 16, 1935 |
| 2,071,797 | Kifer | Feb. 23, 1937 |
| 2,268,745 | Frauenghal | Jan. 6, 1942 |

FOREIGN PATENTS

| Number | Country | Date |
| --- | --- | --- |
| 418,724 | Great Britain | Oct. 30, 1934 |
| 467,728 | Great Britain | June 22, 1937 |